116,476

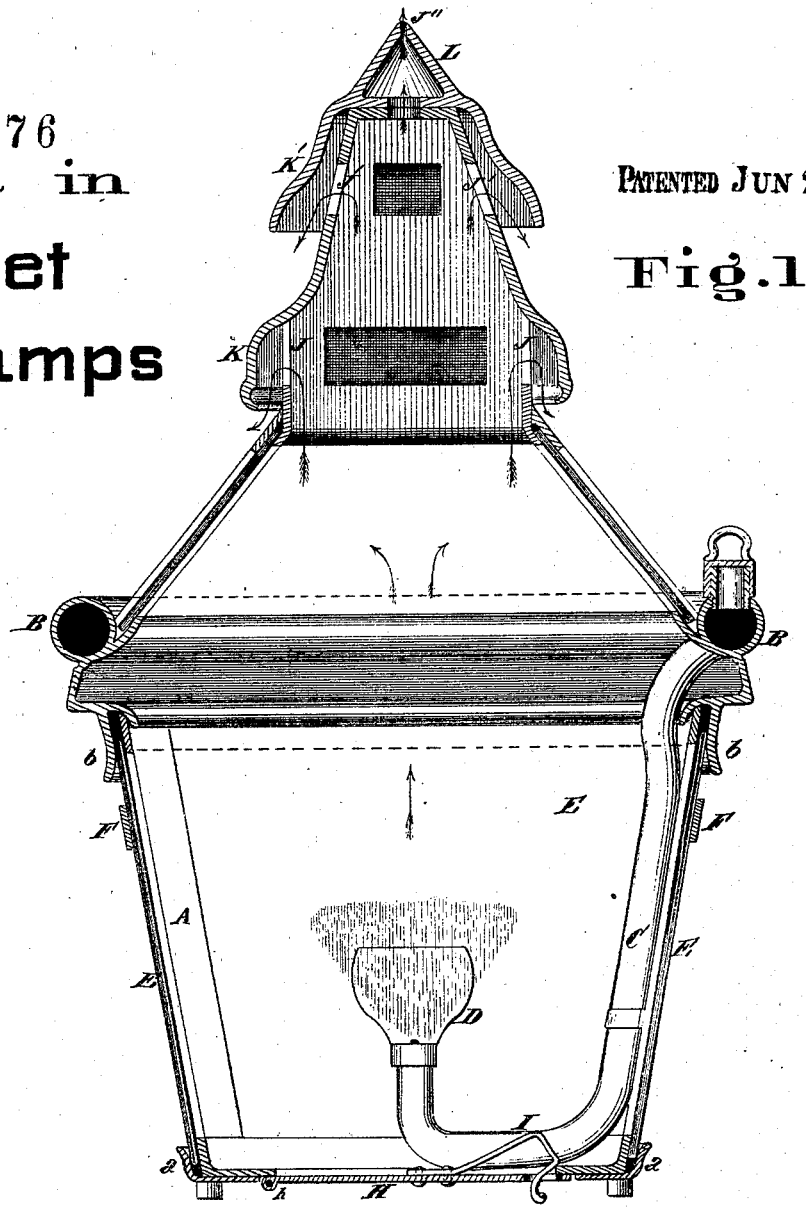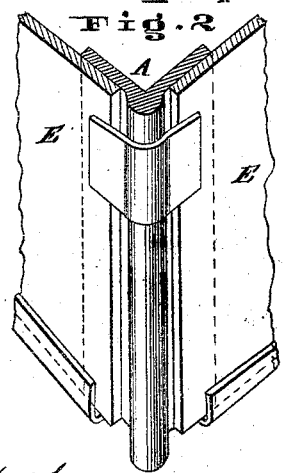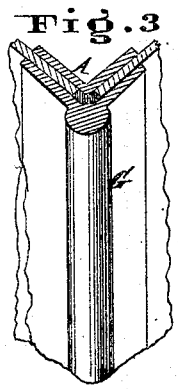

UNITED STATES PATENT OFFICE.

THOMAS NORTH, OF CINCINNATI, OHIO.

IMPROVEMENT IN STREET-LAMPS.

Specification forming part of Letters Patent No. 116,476, dated June 27, 1871.

*To all whom it may concern:*

Be it known that I, THOMAS NORTH, of Cincinnati, Hamilton county, State of Ohio, have invented a certain new and useful Improvement in Street-Lamps for Burning Gasoline, of which the following is a specification:

My invention has for its object the production of a street-lamp especially adapted for the use of gasoline or other burning-fluid, where the glass sides of the lamp must necessarily be tightly fitting and wind-currents through the lamp prevented; and my invention consists in certain devices for tightly securing the glass sides of the lamp to the frame, and covering the apertures for the escape of heated air by overhanging hoods, to prevent the passage of wind-currents through the lamp, while a strong upward draught is maintained by the wind passing over an aperture in the apex of the cone in which the upper hood terminates.

Figure 1 is a vertical central section of a lamp embodying my invention. Fig. 2 is a perspective section of a portion of one of the side corners. Fig. 3 is a perspective section of a portion of one of the top or roof corners.

A A A A represent the angle-iron forming the corners of the lamp, both sides and top; B, the reservoir for gasoline or burning-fluid; and C, the pipe supplying the burner D. As it is necessary for reservoir B to be above the glass sides E of the lamp, the glass cannot be slipped in from the top; and, as it is necessary that the glass should be so secured that it cannot rattle or permit the passage of currents of air at the corners, I have devised the following fastening for the glass sides: A flaring groove, a, is provided across the lower edge of each side for the reception of the glass E, and a similar flaring groove or channel, b, at the upper edge. The groove b is sufficiently deep to permit the glass to pass up far enough to enable it to pass over the upper edge of the lower groove, when it can fall into the position shown in the drawing. It is then secured tightly, to prevent rattling or the passage of currents of air, by means of the leaden clips F, which are bent so as to press tightly against the glass. The glass in the roof I prefer to secure by leaden clips G, extending the entire depth of glass. A door, H, hinged at h, is provided at the bottom of the lamp, through which the burner is lighted, the door being self-fastening, when closed, by means of spring-wire catch I. Holes J J′ J″ are provided at the top of the lamp for the escape of heated air and gases; and in order to prevent wind-currents from passing in through these apertures I project over them hoods K K′, and shape the top conical, as shown at L. The hoods prevent wind entering the holes J J′, and the conical top causes the wind which passes over it to attract an upward current through hole J″.

I claim—

The herein-described gasoline street-lamp case, in which the glass sides are secured to the frame by the grooves a and b and leaden clips F, and the apertures J J′ covered by overhanging hoods K and K′, the conical top L of the upper hood K′ being provided with an aperture, J″, at the apex, substantially in the manner and for the purposes set forth.

In testimony of which invention I hereunto set my hand.

<div style="text-align:right">his<br>THOMAS + NORTH.<br>mark.</div>

Witnesses:
FRANK MILLWARD,
J. B. MANNIX.